Patented May 25, 1943

2,319,960

UNITED STATES PATENT OFFICE 2,319,960

PROCESS FOR PRODUCING HALOGENATED CRESOLS

Cyril Stanton Treacy, Cranford, N. J., assignor to Merck & Co., Inc., Rahway, N. J., a corporation of New Jersey No Drawing. Application May 23, 1941, Serial No. 394,886

1 Claim. (Cl. 260—623)

This invention relates to processes for the production of halogenated cresols.

More specifically, the invention is concerned with an improved process for the production of tetrabrom-o-cresol.

In tetrabrominating cresol, the reaction goes as follows:

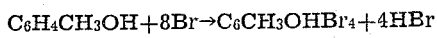

$$C_6H_4CH_3OH + 8Br \rightarrow C_6CH_3OHBr_4 + 4HBr$$

However, it is known that the reaction will not proceed satisfactorily without the addition of a catalyst. Various methods have been proposed in the prior art for producing tetrabrom-o-cresol. One such method involves the reaction between o-cresol and bromine with aluminum dissolved in the bromine, no other solvent being present. This process is not practicable for large-scale commercial manufacturing purposes.

Another process of the prior art involves the use of a solution of o-cresol and carbon tetrachloride or chloroform, the solution then being brominated with the addition of liquid bromine in the presence of iron. In this process the tetrabrom-o-cresol formed is accompanied by gummy, low melting products which are difficult to separate.

It has also been attempted by me to brominate o-cresol in the presence of aluminum powder by dissolving the o-cresol in carbon tertachloride, and then adding the bromine. However, in this case the reaction slows preceptibly and then proceeds very slowly after addition of only about ¼ of the bromine necessary to produce the tetrabromo compound.

I have discovered that tetrabrom-o-cresol may be obtained, by an improved process, in a yield of 95% or over, without appreciable quantities of accompanying by-products, and without resort to recrystallization from an organic solvent.

According to my improved process, the reaction is carried out in a specific series of steps, and in the presence of a dual catalyst, which may, for example, comprise aluminum and iron.

The following example illustrates a method of carrying out the present invention, but it is to be understood that this example is given by way of illustration and not of limitation.

Example 21.6 gm. of o-cresol are dissolved in about 360 gms. of carbon tetrachloride. 2 gm. of fine aluminum powder are added. Bromine is added slowly at room temperature, until evolution of hydrobromic acid almost ceases and the solution becomes red. 1 gm. of fine iron powder is added, and bromine addition is continued until 136 gm. have been added, which requires about one hour. The reaction is let stand for 24 hours, an additional small quantity of bromine being added, if necessary. The carbon tetrachloride, any excess bromine, and absorbed hydrobromic acid are evaporated at 70°–80° C. The residue is thoroughly washed with a solution of 900 gm. of water containing 100 gms. of hydrochloric acid (sp. g. 1.19). Crude tetrabrom-o-cresol is filtered off and washed with water. It is dissolved in two liters of water containing 10 gms. of sodium hydroxide at 30° C., and the solution filtered. Tetrabrom-o-cresol is precipitated with dilute hydrochloric acid (about 35 gm. of 34% hydrochloric acid diluted 1–10), filtered, washed, and dried.

Modifications may be made in carrying out the present invention without departing from the spirit and scope thereof, and I am to be limited only by the appended claim.

I claim:

The process comprising mixing aluminum powder with o-cresol in carbon tetrachloride, adding bromine, adding iron powder, and continuing the addition of bromine until sufficient bromine to produce tetrabrom-o-cresol has been taken up.

CYRIL STANTON TREACY.